US012186274B2

(12) United States Patent
Chen

(10) Patent No.: US 12,186,274 B2
(45) Date of Patent: Jan. 7, 2025

(54) REMINDER APPARATUS AND MEDICATION CONTAINER

(71) Applicant: HAIKOU LILI INVESTMENT CO., LTD., Haikou (CN)

(72) Inventor: Junyuan Chen, Haikou (CN)

(73) Assignee: HAIKOU LILI INVESTMENT CO., LTD., Haikou (CN)

( * ) Notice: Subject to any disclaimer, the term of this patent is extended or adjusted under 35 U.S.C. 154(b) by 174 days.

(21) Appl. No.: 17/949,248

(22) Filed: Sep. 21, 2022

(65) Prior Publication Data

US 2024/0058221 A1 Feb. 22, 2024

(30) Foreign Application Priority Data

Aug. 22, 2022 (CN) ........................ 202222211898.X

(51) Int. Cl.
*A61J 7/04* (2006.01)

(52) U.S. Cl.
CPC .................................. *A61J 7/0409* (2013.01)

(58) Field of Classification Search
CPC ............. A61J 7/04; B65D 51/245; G09F 9/00
USPC ........................................... 206/534; 116/308
See application file for complete search history.

(56) References Cited

U.S. PATENT DOCUMENTS 576,833 A * 2/1897 Chapman ................. A61J 7/04 116/308
3,776,177 A * 12/1973 Bryant .................... G07C 7/00 40/503
4,703,712 A * 11/1987 Christman ........... H01H 15/025 200/16 R
5,984,122 A * 11/1999 Barker .................. G06M 1/248 215/277
2003/0111006 A1* 6/2003 DuBarry ................... G09F 9/00 116/308
2008/0168940 A1* 7/2008 Duer ......................... G09F 7/00 116/324
2009/0064920 A1* 3/2009 Duer ......................... A61J 7/04 116/324
2010/0314283 A1* 12/2010 Noble .................... B65D 83/04 206/534
2011/0297075 A1* 12/2011 Coon ...................... G09F 9/302 116/323
2016/0106626 A1* 4/2016 Barajas ..................... A61J 1/03 206/534

FOREIGN PATENT DOCUMENTS

CN 206885733 U 1/2018

OTHER PUBLICATIONS

Amazon, 5-Pack Reusable 7-Day Pill Trackers—Attach to Bottles, Organize Medicines, Vitamins, Pets, https://www.amazon.com/Day-Weekly-Pill-Organizer-Take-n-Slide/dp/B078ZLCRFS?th=1, Jan. 16, 2018 (Year: 2018).*

* cited by examiner

*Primary Examiner* — Ernesto A Grano
*Assistant Examiner* — Symren K Sanghera

(57) ABSTRACT

A reminder apparatus includes: a housing and a rotation block; wherein the rotation block is rotatably arranged in the housing, an identification structure is arranged on a surface of the rotation block, and a viewing window is defined on the housing, such that the identification structure is exposable via the viewing window in the case that the rotation block is rotated.

16 Claims, 6 Drawing Sheets

REMINDER APPARATUS AND MEDICATION CONTAINER

CROSS-REFERENCE TO RELATED APPLICATIONS

The present disclosure claims priority to Chinese Patent Application No. 202222211898.X, filed with the Chinese Patent Office on Aug. 22, 2022, titled "REMINDER APPARATUS AND MEDICATION CONTAINER", the entire contents of which are incorporated herein by reference.

TECHNICAL FIELD

The present disclosure relates to the technical field of item reminder apparatus, and in particular, relates to a reminder apparatus and a medication container.

BACKGROUND

Medications are generally received in a medication bottle or box. With respect to some patients, a variety of medications need to be taken and taken frequently. Therefore, the patients may easily take the medication repeatedly for one time or miss the current medication. As a result, within a medication administration cycle, the patient may take an insufficient dose of the medication or an overdose of the medication. This leads to a poor treatment effect or causes damages to health of the patients.

SUMMARY

According to a first aspect of embodiments of the present disclosure, a reminder apparatus is provided. The reminder apparatus includes: a housing and a rotation block; wherein the rotation block is rotatably arranged in the housing, an identification structure is arranged on a surface of the rotation block, and a viewing window is defined on the housing, such that the identification structure is exposable via the viewing window in the case that the rotation block is rotated.

According to a second aspect of embodiments of the present disclosure, a medication container is provided. The medication container includes: a container body and the reminder apparatus as described above; wherein the container body is configured to receive a medication, and the reminder apparatus is fixed to the container body.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present disclosure. In all the accompanying drawings, like reference numerals denote like parts. In the drawings.

Figure 1:
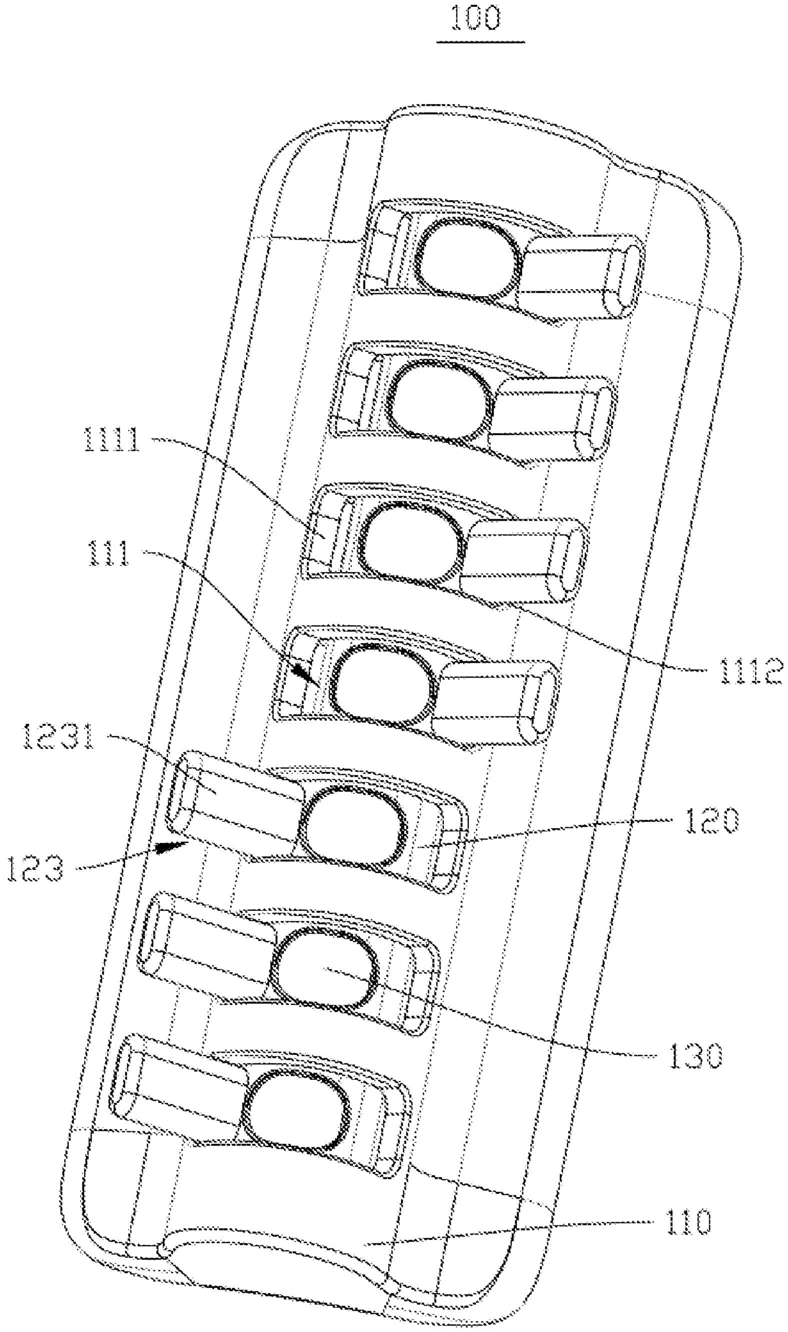
FIG. 1 is a schematic structural view of a reminder apparatus according to an embodiment of the present disclosure.

Reference numerals in the embodiments and denotations thereof:

100—Reminder apparatus; 110—housing; 120—rotation block; 130—identification structure; 111—viewing window; 121—circumferential outer wall of rotation block; 112—abutting inner wall; 122—damping structure; 1221—polygonal abutting section; 131—first identification portion; 132—second identification portion; 12211—abutting face; 12211*a*—abutting faces at two ends; 12211*b*—abutting face at a middle section; 12211*aa*—first face; 1221*ab*—second face; 12211*ba*—third face; 12211*bb*—fourth face; 113—base; 114—lid; 1132—arc-shaped section; 123—toggle structure; 1231—toggle lever; 1111—first inner wall; 1112—second inner wall; 114*a*—receiving space; 1131—second latch; 1141—first latch; 1141*a*—first arc-shaped face; 1131*a*—second arc-shaped face; 1141*b*—first flat face; 1131*b*—second flat face; 1113—spacer plate; 200—medication container; 210—container body.

DETAILED DESCRIPTION

The embodiments containing the technical solutions of the present disclosure are described in detail with reference to the accompanying drawings. The embodiments hereinafter are only used to clearly describe the technical solutions of the present disclosure. Therefore, these embodiments are only used as examples, but are not intended to limit the protection scope of the present disclosure.

Unless defined otherwise, all technical and scientific terms used herein have the same meaning as commonly understood by one of ordinary skill in the art to which this application pertains. The terms used herein in the specification of present disclosure are only intended to illustrate the specific embodiments of the present disclosure, instead of limiting the present disclosure. The terms "comprise," "include," and any variations thereof in the specification, claims, and the description of the drawings of the present disclosure are intended to cover a non-exclusive inclusion.

In the description of the present disclosure, the terms "first," "second," and the like are only used for distinguishing different objects, but shall not be understood as indication or implication of relative importance or implicit indication of the number of the specific technical features, the specific sequence or priorities. In the description of the embodiments of the present disclosure, the term "multiple" or "a plurality of" signifies at least two, unless otherwise specified.

The terms "example" and "embodiment" in this specification signify that the specific characteristic, structures or features described with reference to the embodiments may be covered in at least one embodiment of the present disclosure. This term, when appears in various positions of the specification, neither indicates the same embodiment, nor indicates an independent or optional embodiment that is exclusive of the other embodiments. A person skilled in the art would implicitly or explicitly understand that the embodiments described in this specification may be incorporated with other embodiments.

In the description of the embodiments of the present disclosure, the term "and/or" is merely an association relationship for describing associated objects, which represents that there may exist three types of relationships, for example, A and/or B may represent three situations: only A exists, both A and B exist, and only B exists. In addition, the symbol "/" generally represents an "or" relationship between associated objects before and after the symbol.

In the description of the embodiments of the present disclosure, the term "multiple" or "a plurality of" signifies more than two (including two), unless otherwise specified. Likewise, the term "a plurality of groups" or "multiple groups" signifies more than two groups (including two groups), and the term "a plurality of pieces" or "multiple pieces" signifies more than two pieces (including two pieces).

In the description of the embodiments of the present disclosure, it should be understood that the terms "central," "transversal," "longitudinal," "length," "width," "thickness," "upper," "lower," "front," "rear," "left," "right," "vertical," "horizontal," "top," "bottom," "inner," "outer," "clockwise," "counterclockwise," "axial," "radial," "circumferential," and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure.

In the description of the embodiments of the present disclosure, it should be noted that unless otherwise specified and defined, the terms "mounted," "coupled," "connected," "fixed," and derivative forms thereof shall be understood in a broad sense, which, for example, may be understood as fixed connection, detachable connection or integral connection; may be understood as mechanical connection or electrical connection, or understood as direct connection, indirect connection via an intermediate medium, or communication between the interiors of two elements or interactions between two elements. Persons of ordinary skill in the art may understand the specific meanings of the above terms in the embodiments of the present disclosure according to the actual circumstances and contexts.

For patients who need to take varieties of medications frequently, they may easily forget to take medications, or miss the current medications or take an overdose of medications, resulting in insufficient dose or causing damages to their health. Therefore, it is necessary to provide a reminder apparatus for the patients for reminding them to take medications.

To overcome the above problem, the present disclosure provides a reminder apparatus. In the reminder apparatus, a rotation block is rotatably arranged on a rotation block, and a viewing window is defined on a housing, such that in the case that the rotation block is rotated, an identification structure on a surface of the rotation block may be exposed via the viewing window. In this way, the exposed identification structure may be configured to remind a user whether a medication is taken or whether an item is finished.

Figure 2:
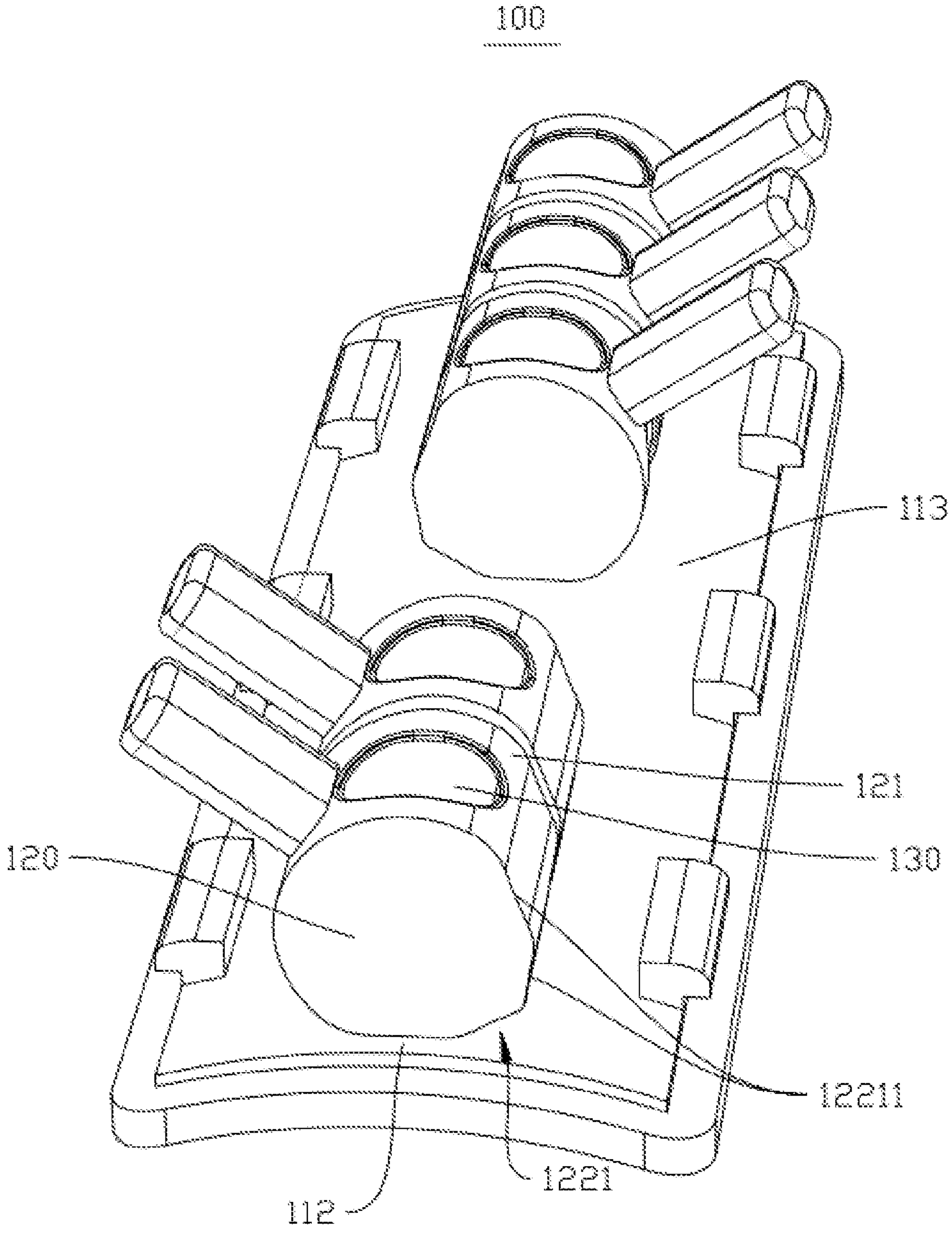
FIG. 2 is a schematic structural view of the reminder apparatus with a housing removed according to an embodiment of the present disclosure.

Referring to FIG. 1 and FIG. 2, FIG. 1 illustrates a schematic structural view of a reminder apparatus according to an embodiment of the present disclosure, and FIG. 2 illustrates a schematic structural view of the reminder apparatus with a housing removed according to an embodiment of the present disclosure. The present disclosure provides a reminder apparatus 100. The reminder apparatus 100 includes: a housing 110 and a rotation block 120; wherein the rotation block 120 is rotatably arranged in the housing 110, an identification structure 130 is arranged on a surface of the rotation block 120, and a viewing window 111 is defined on the housing 110, such that the identification structure 130 is exposable via the viewing window 111 in the case that the rotation block 120 is rotated.

The reminder apparatus 100 is configured to remind users whether a pre-scheduled item needs to be performed, for example, reminding items that need to be performed in daily life, especially some periodical items. The reminder apparatus 100 may be a reminder apparatus for medication taking, or may be a reminder apparatus for other daily-scheduled items.

The identification structure 130 may be a time text, a label, a sticker, a scale, a recessed mark or the like, and is configured to remind users whether an item is to be performed.

Specifically, the reminder apparatus 100 may be placed in the vicinity of a medication bottle or attached on the medication bottle, and the identification structure 130 may be a colored label for reminding a patient whether the medication has been taken. In practice, the rotation block 120 may be rotated in advance, such that the colored label is hidden in the housing 110. In this state, the user is reminded to take the medication when necessary. In the case that the user takes the medication, the rotation block 120 is rotated, such that the colored label is exposed via the viewing window 111, to remind the user that this medication taking is finished. In this way, the user is prevented from forgetting to take the medication or taking the medication repeatedly. Further, a plurality of rotation blocks may be arranged, for example, three rotation blocks. The three rotation blocks are rotated, such that three identification structures 130 are hidden in the housing 110. The patient is reminded to take the medication in the morning, at the noon and in the evening every day. When the patient takes the medication in the morning, one of the rotation blocks 120 is rotated, such that one of the identification structures 130 is exposed to remind the patient that he or she has taken the medication in the morning, whereas he or she subsequently needs to take the medication at the noon and in the evening. When the patient has taken the medication at the noon, another of the rotation blocks 120 is rotated. In this case, two of the identification structures 130 are exposed to remind the patient that he or she has taken the medication in the morning and at the noon, whereas he or she needs to take the medication in the evening. Such operations are repeated until the patient finishes the medication taking in the evening. Preferably, the identification structure 130 may be set to texts saying morning, noon and evening, or date identifications of morning, noon and evening may be arranged on the housing 110 in the vicinity of the rotation block 120 to remind the patient whether the medication has been taken at the specific time.

The rotation block 120 is rotatably arranged in the housing 110, such that in the case that the rotation block 120 is placed in the housing 110, the rotation block 120 is rotatably engaged with the housing 110. The engagement between the rotation block 120 and the housing 110 is structurally simple, which facilitates manufacturing, and lowers manufacturing costs. The identification structure 120 is arranged on the surface of the rotation block 120, and the viewing window 111 is defined on the housing 110, such that in the case that the rotation block 120 is rotated, the identification structure 130 is exposed via the viewing window 111. In this way, the user may know, from the exposed identification structure 130, whether the current medication has been taken. Nevertheless, in the case that the identification structure 130 is not exposed, the user may be reminded, by the identification structure 130, to take the medication at a specific time.

Figure 3:
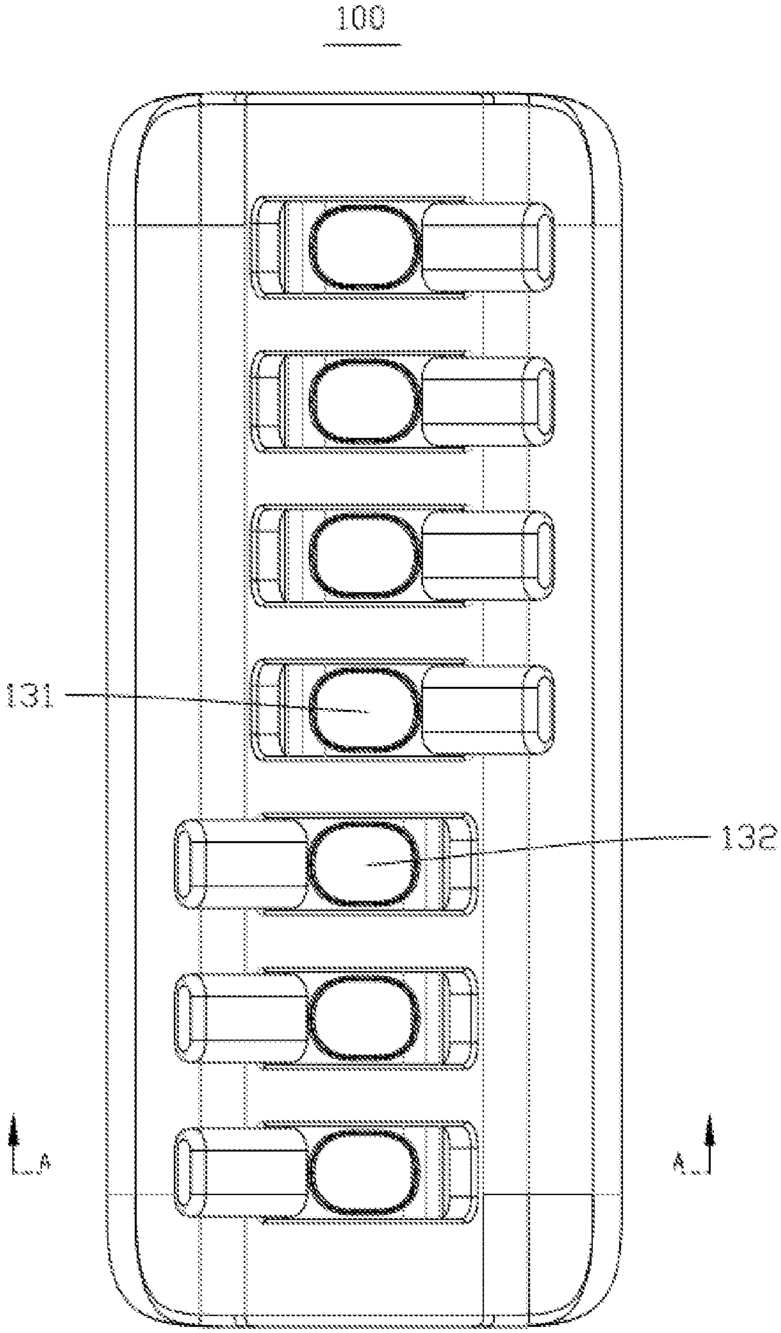
FIG. 3 is a schematic top view of the reminder apparatus according to an embodiment of the present disclosure.
Figure 4:
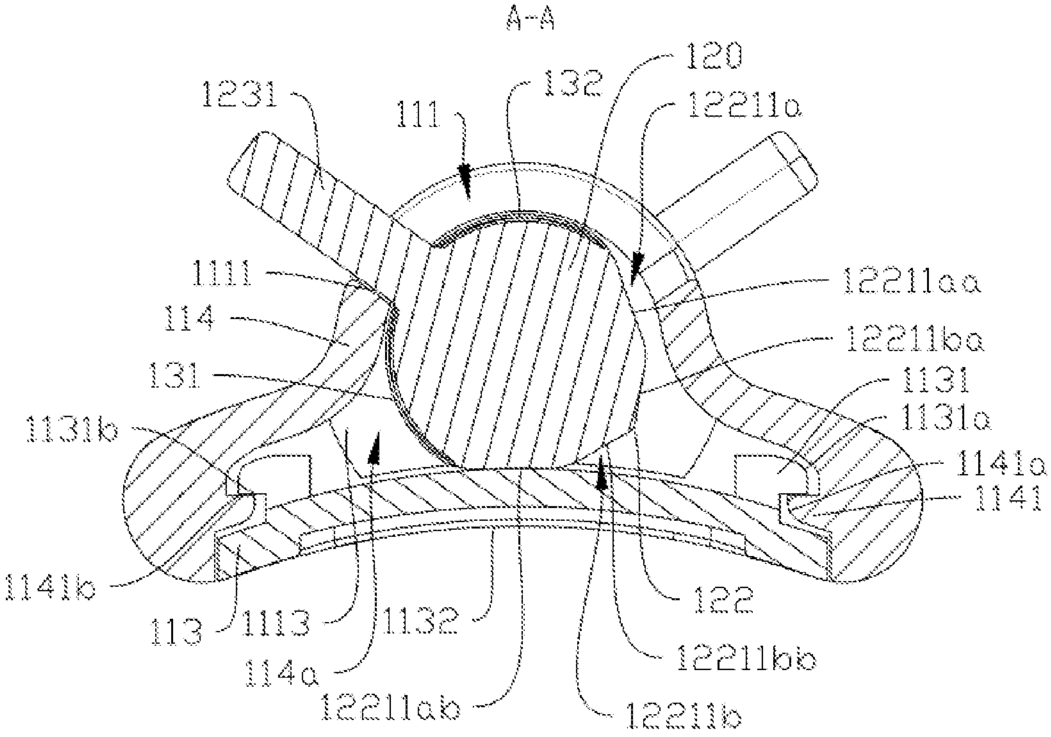
FIG. 4 is a schematic sectional view taken along an A-A direction in FIG. 3.

Still referring to FIG. 2, in further combination with FIG. 3 and FIG. 4, FIG. 3 illustrates a schematic top view of the reminder apparatus according to an embodiment of the present disclosure, and FIG. 4 illustrates a schematic sectional view taken along an A-A direction in FIG. 3. In an optional embodiment, the identification structure 130 is arranged a circumferential outer wall 121 of the rotation block 120, and the housing 110 is provided with an abutting inner wall 112 opposite to the viewing window 111; wherein a damping structure 122 is arranged on the circumferential outer wall of the rotation block 120, such that in the case that the rotation block 120 is rotated, the damping structure 122 is engaged with the abutting inner wall 112 to increase an action force between the rotation block 120 and the housing 110.

The damping structure 122 is preferably made of an elastic material. In the case that the rotation block is rotated, the damping structure 122 is abutted against the abutting inner wall 112 and is elastically deformed, such that the rotation block is rotatable relative to the housing.

The damping structure 122 may be a wavy elastic sheet arranged on the rotation block 120, and correspondingly, a wavy elastic sheet may also be arranged on the abutting inner wall 112. By engagement between these two wavy elastic sheets, the action force between the rotation block 120 and the housing 110 may be increased, and meanwhile a tactile sense of the user when rotating the rotation block 120 is improved. The damping structure 122 may also be a rubber ring sleeved onto an outer wall of the rotation block 120 to increase a friction resistance between the rotation block 120 and the housing 110.

In the case that the abutting inner wall 112 is arranged on the housing 110, the damping structure 122 on the rotation block 120 is rotated to be engaged with the abutting inner wall 112 to increase the action force between the rotation block 120 and the housing 110 during rotation of the rotation block 120, which achieves a better damping effect. In this way, the tactile sense of the user when rotating the rotation block 120 may be improved. In addition, the damping structure 122 is arranged on the circumferential outer wall of the rotation block 120, such that in the case that the reminder apparatus 100 is shaken, the rotation block 120 may not be easily rotated due to a reaction force between the damping structure 122 and the abutting inner wall 112, and the identification structure 130 is still maintained at an original properly-adjusted state. This prevents incorrect reminders.

Still referring to FIG. 2 to FIG. 4, in an optional embodiment, the damping structure 122 includes a polygonal abutting section 1221; wherein the polygonal abutting section 1221 includes a plurality of adjacent abutting faces 12211, such that in the case that the rotation block 120 is rotated, the plurality of abutting faces 12211 are successively abuttable against the abutting inner wall 112 to fix the rotation block 120 to different rotation positions.

The damping structure 122 is set to the polygonal abutting section including the plurality of adjacent abutting faces 12211, such that in the case that the rotation block 120 is rotated, the plurality of abutting faces 12211 are successively abutted against the abutting inner wall 112. Specifically, in the case that a state where one of the plurality of abutting faces 12211 is abutted against the abutting inner wall 112 is transitioned to a state where another of the plurality of abutting faces 12211 is abutted against the abutting inner wall 112, a greater reaction force may be caused between a joint of these two abutting faces 12211 and the abutting inner wall 112, such that a better damping effect is achieved. In addition, in the case that the plurality of abutting faces 12211 are successively abutted against and engaged with the abutting inner wall 112, the tactile sense of the user when rotating the rotation block 120 is effectively improved.

Still referring to FIG. 3 and FIG. 4, in an optional embodiment, the identification structure 130 includes a first identification portion 131 and a second identification portion 132; wherein the first identification portion 131 and the second identification portion 132 are arranged along a circumferential direction of the rotation block 120, such that the first identification portion 131 is exposed via the viewing window 111 in the case that the rotation block 120 is rotated along a first direction, and the second identification portion 132 is exposed via the viewing window 111 in the case that the rotation block 120 is rotated along a second direction; and along the circumferential direction of the rotation block 120, an area of the abutting face 12211*a* at either of two ends is greater than an area of the abutting face 12211*b* at a middle section, and one of the abutting faces 12211*a* at the two ends is arranged away from the first identification portion 131 along a radial direction of the rotation block 120, and the other of the abutting faces 12211*a* at the two ends is arranged away from the second identification portion 132 along the radial direction of the rotation block 120.

In the first direction and the second direction, one is a clockwise direction, and the other is a counterclockwise direction. Still referring to FIG. 3 and FIG. 4, the abutting faces 12211*a* at the two ends include a first face 12211*aa* and a second face 12211*ab*; wherein the first face 12211*aa* is arranged away from the first identification portion 131 along the radial direction of the rotation block 120, and the second face 12211*ab* is arranged away from the second identification portion 132 along the radial direction of the rotation block 120. The abutting face 12211*b* at the middle section may include a third face 12211*ba* and a fourth face 12211*bb*.

Specifically, the first identification portion 131 may be a green label, and the second identification portion 132 may be a red label; wherein the second identification portion 132 may be configured to remind the user that the medication needs to be taken at the specific time, and the first identification portion 132 is configured to remind the user that the medication has been taken. Specifically, in the case that the user finds that the second identification portion 132 is exposed via the viewing window 111 (as illustrated in FIG. 4), the user takes the medication. Upon completion of the medication taking, the rotation block 120 is rotated along the clockwise direction, and during the rotation, the second face 122 lab, the fourth face 12211*bb*, the third face 12211*ba*, and the first face 12211*aa* are successively abutted against and engaged with the abutting inner wall 112, such that the second identification portion 132 is hidden in the housing 110, and the first identification portion 131 is exposed via the viewing window 111 to record the medication taking and remind completion of the medication taking.

The first identification portion 131 and the second identification portion 132 are arranged along the circumferential direction of the rotation block 120, such that in the case that the rotation block 120 is rotated along the two directions, the first identification portion 131 and the second identification portion 132 are respectively exposed to remind the patient of two different medication taking items, such that the patient is prevented from forgetting to take the medication or repeatedly taking the medication. The abutting faces 12211*a* at the two ends are arranged away from the identification structure 130 along the radial direction of the rotation block 120, such that in the case that the rotation block 120 is rotated along the two directions, one of the abutting faces 12211*a* at the two ends is abutted against the abutting inner wall, and hence the first identification portion 131 or the second identification portion 132 is exposed. In addition, since the area of the abutting face 12211*a* at either of the two ends is greater than the area of the abutting face 12211*b* at the middle section, the abutting faces 12211*a* at the two ends are more stably abutted against the abutting inner wall 112, such that in the case that the rotation block 120 is properly rotated, the first identification portion 131 or the second identification portion 132 is maintained in a better state. This prevents the case where in the case that the rotation block 120 is touched by mistake, the state of the identification structure 130 is changed and thus the medication taking item is incorrectly reminded to the patient.

Still referring to FIG. 3 and FIG. 4, in an optional embodiment, the housing 110 includes a base 113 and a lid 114; wherein the lid 114 is covered on and fixed to the base 113 to define a receiving space 114*a*, and the rotation block 120 is arranged in the receiving space 114*a*.

Still referring to FIG. 4, a first latch 1141 is arranged on an inner wall of the lid 114, wherein the inner wall is disposed on the side of the rotation block 120, and a second latch 1131 is arranged on a side where the lid 114 is covered on the base 113; wherein the second latch 1131 and the first latch 1141 are oppositely arranged, such that the lid 114 is covered on the base 113 via the first latch 1141 and the second latch 1131 that are engaged with each other; and wherein the first latch 1141 is protruded from an inner wall of the lid 114, the second latch 1131 is protruded from an inner wall of the base 113, the first latch 1141 and the second latch 1131 respectively include a first arc-shaped face 1141*a* and a second arc-shaped face 1131*a*, wherein during assembling the lid 114 and the base 113, the first arc-shaped face 1141*a* and the second arc-shaped face 1131*a* push each other and are deformed, such that the first latch 1141 and the second latch 1131 are engaged and fixed. In addition, the first latch 1141 and the second latch 1142 respectively include a first flat face 1141*b* and a second flat face 1131*b*; wherein the first flat face 1141*b* and the second flat face 1131*b* are engaged with each other in the case that the first latch 1141 and the second latch 1131 push each other.

The housing 110 is set to include the base 113 and the lid 114, such that during assembling of the reminder apparatus 100, the rotation block 120 may be firstly placed in the lid 114, and then the lid 114 is covered on and fixed to the base 113. In this case, the assembling of the reminder apparatus 100 is completed. The entire process is convenient and quick, and easy to operate. In this way, an efficiency of assembling the reminder apparatus 100 may be effectively improved.

Still referring to FIG. 2 and FIG. 4, in an optional embodiment, the viewing window 111 is defined on the lid 114, and the base 113 includes an arc-shaped section 1132 recessed toward the lid 114; wherein the abutting inner wall 112 is formed on an inner wall of the arc-shaped section 1132.

Specifically, an outer wall of the arc-shaped section 1132 on the base 113 may be attached to the medication bottle having an arc-shaped surface by an absorption structure or an adhesive to fix the base 113 onto the medication bottle, such that the reminder apparatus 100 is movable with the medication bottle. This more conveniently reminds the patient whether the medication needs to be taken.

The base 113 is set to include the arc-shaped section 1132 recessed towards the lid 114, such that in the case that the rotation block 120 is rotated, the damping structure 122 is more tightly abutted against an inner wall of the arc-shaped section 1132. In this way, structural stability of the rotation block 120 is enhanced.

Still referring to FIG. 1, in an optional embodiment, a toggle structure 123 is arranged on the circumferential outer wall of the rotation block 120; wherein the toggle structure 123 is exposed via the viewing window 111.

Specifically, the toggle structure 123 may be a recess arranged in the circumferential outer wall of the rotation block 120, and a finger is inserted into the recess via the viewing window 111 and toggle the recess to drive the rotation block 120 to rotate.

The toggle structure 123 is arranged on the circumferential outer wall of the rotation block 120, and the toggle structure 123 is exposed via the viewing window 111, such that it is convenient to apply a force to the toggle structure 123 to drive the rotation block 120 to rotate.

Still referring to FIG. 1 and FIG. 3, in an optional embodiment, the toggle structure 123 includes a toggle lever 1231; wherein the toggle lever 1231 is protruded from a surface of the housing 110 via the viewing window 111, such that in the case that the rotation block 120 rotates, the toggle lever 1231 is abutted against inner walls on two opposite sides of the viewing window 111 along a circumferential direction of the rotation block 120 to restrict a maximum stroke of the rotation block 120.

Still referring to FIG. 1, the inner walls on the two opposite sides of the viewing window 111 include: a first inner wall 1111 and a second inner wall 1112. In the case that the toggle lever 1231 is toggled along a counterclockwise direction, the toggle lever 1231 is abutted against the first inner wall 1111 to restrict continuous rotation of the rotation block 120, and in the case that the toggle lever 1231 is toggled along a clockwise direction, the toggle lever 1231 is abutted against the second inner wall 1112 to restrict continuous rotation of the rotation block 120.

The toggle lever 1231 is protruded from a surface of the housing 110, such that the user may directly and conveniently apply a force to the toggle lever 1231 to drive the rotation block 120 to rotate, with no need of stretching his or her finger into the viewing window 111 that is narrow and small. Further, the toggle lever 1231 is abutted against inner walls on two opposite sides of the viewing window 111 along the circumferential direction of the rotation block 120 to restrict the maximum stroke of the rotation block 120. This prevents the identification structure 130 to be exposed from being hidden in the housing 110 due to over-rotation of the rotation block 120, and finally ensures accuracy of exposing the identification structure 130.

Still referring to FIG. 1, in an optional embodiment, a plurality of rotation blocks 120 are arranged; wherein the plurality of rotation blocks 120 are axially arranged in the housing 110, a plurality of viewing windows 111 are defined on the housing 110, the number of rotation blocks 120 is equal to the number of viewing windows 111, and the rotation blocks 120 are arranged in one-to-one correspondence to the viewing windows 111.

Specifically, the number of rotation blocks 120 is preferably seven, days Monday to Sunday are marked on the identification structure 130 or at positions on the housing 110 corresponding to the rotation block 120. The rotation block 120 is rotated such that the identification structure 130 is hidden in the housing 110 to remind the patient that the medication needs to be taken for seven days. When the patient takes the medication on Monday, he or she rotates the rotation block 120 corresponding to Monday, such that the identification structure 130 on the rotation block is exposed via the viewing window 111 to remind the patient that he or she has taken the medication Monday. As times goes to Tuesday, when the patient finds that the identification structure corresponding to Tuesday says that he or she needs to take the medication, the patient takes the medication for Tuesday and rotates the rotation block 120 corresponding to Tuesday, such that the identification structure 130 is exposed to remind that the user has taken the medication for Tuesday. Such operations are repeatedly performed until the user takes the medication for Sunday. The state of the identification structure 130 may remind the patient of the time when he or she has taken the medication and the time for the patient to take the medication. In the case that the patient finishes medication taking for a cycle, the rotation block 120 may be reset to remind the patient again whether the medication is taken.

The plurality of rotation blocks 120 are arranged in the housing 110 along the axial direction, the plurality of viewing windows 111 are defined on the housing 110, and the rotation blocks 120 are in one-to-one correspondence to the viewing windows, such that within a medication administration cycle, the rotation block 120 only needs to be rotated once, and the reminder apparatus 100 is capable of reminding the patient that he or she needs to take the medication for multiple times within the cycle. Each time the patient takes the medication, one rotation block 120 is rotated to record and remind that the current medication has been taken. The rotation blocks 120 that have not been rotated remind that the patient needs to take the medication at the proper time. This prevents the patient from forgetting to take the medication or repeatedly taking the medication.

Figure 5:
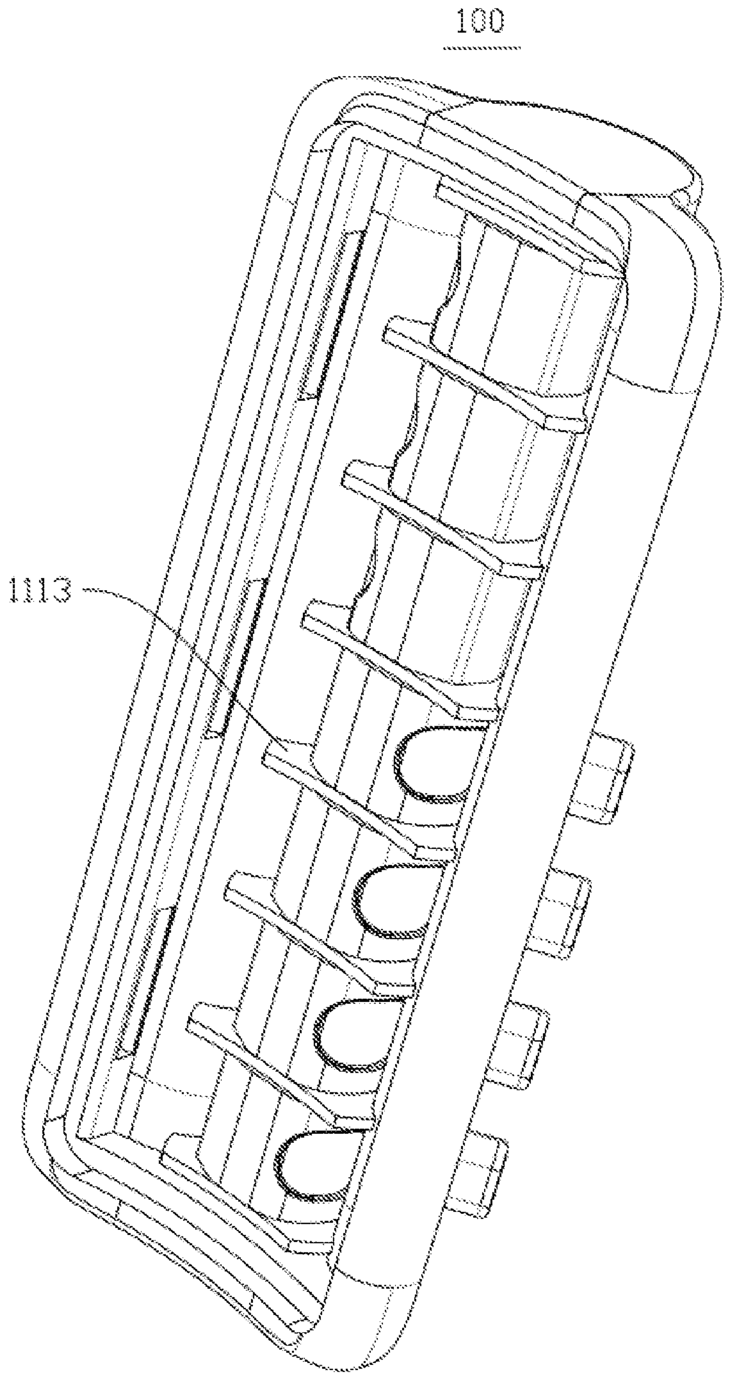
FIG. 5 is a schematic structural view of the reminder apparatus with a base removed according to an embodiment of the present disclosure.

Referring to FIG. 4 and FIG. 5, FIG. 5 illustrates a schematic structural view of the reminder apparatus with a base removed according to an embodiment of the present disclosure. A spacer plate 1113 is arranged between each two adjacent rotation blocks on the housing 110; wherein the spacer plate 1113 is configured to space the adjacent rotation blocks 120 apart and limit the rotation blocks 120. Specifically, in the case that one of the rotation blocks 120 is rotated, the spacer plate 1113 may prevent the adjacent rotation blocks 120 from being rotated due to direct contact between the rotation blocks 120, and may limit the rotation blocks 120.

Figure 6:
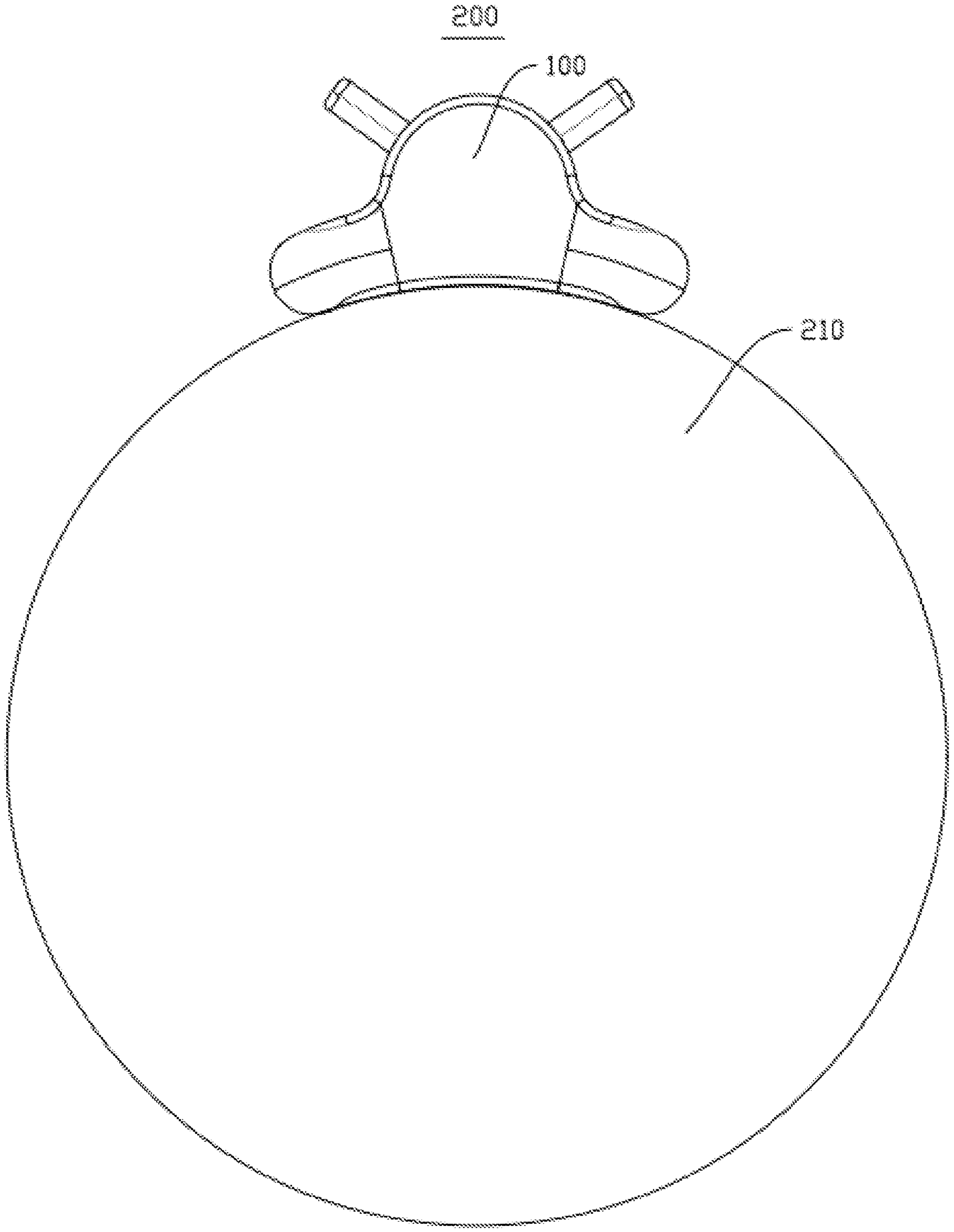
FIG. 6 is a schematic structural view of a medication container according to an embodiment of the present disclosure.

Referring to FIG. 6, FIG. 6 illustrates a schematic structural view of a medication container according to an embodiment of the present disclosure. According to another aspect of the present disclosure, the present disclosure provides a medication container 200. The medication container 200 includes: a container body 210 and the reminder apparatus 100 as described in any of the above solutions; wherein the container body 210 is configured to receive a medication, and the reminder apparatus 100 is fixed to the container body 210.

The medication body 210 may be a medication bottle, a medication box or the like structure configured to receive medications. The base 113 is adaptive to the container body 210 in terms of appearance, such that the base 113 is attached to or engaged on the container body 210, such that it is convenient to remind the patient whether the medication has been taken.

It should be finally noted that the above-described embodiments are merely for illustration of the present disclosure, but are not intended to limit the present disclosure. Although the present disclosure is described in detail with reference to these embodiments, a person skilled in the art may also make various modifications to the technical solutions disclosed in the embodiments, or make equivalent replacements to a part of or all technical features contained therein. Such modifications or replacement, made without departing from the principles of the present disclosure, shall fall within the scope defined by the claims and the specification of the present disclosure. Especially, various technical features mentioned in various embodiments may be combined in any fashion as long as there is no structural conflict. The present disclosure is not limited to the specific embodiments described herein in this specification, but also includes all the technical solutions falling within the scope subject to the appended claims.

What is claimed is:

1. A reminder apparatus, comprising:
- a housing; and
- a rotation block;
- wherein the rotation block is rotatably arranged in the housing, an identification structure is arranged on a surface of the rotation block, and a viewing window is defined in the housing, such that the identification structure is exposable via the viewing window in the case that the rotation block is rotated;
- wherein the identification structure is arranged on a circumferential outer wall of the rotation block, and the housing is provided with an abutting inner wall opposite to the viewing window; wherein a damping structure is arranged on the circumferential outer wall of the rotation block, such that in the case that the rotation block is rotated, the damping structure is engaged with the abutting inner wall to increase an action force between the rotation block and the housing; and
- wherein the damping structure comprises an abutting section; wherein the abutting section comprises a plurality of adjacent abutting faces, such that in the case that the rotation block is rotated, the plurality of abutting faces are successively abuttable against the abutting inner wall to fix the rotation block to different rotation positions.

2. The reminder apparatus according to claim 1, wherein the identification structure comprises a first identification portion and a second identification portion; wherein the first identification portion and the second identification portion are arranged along a circumferential direction of the rotation block, such that the first identification portion is exposed via the viewing window in the case that the rotation block is rotated along a first direction, and the second identification portion is exposed via the viewing window in the case that the rotation block is rotated along a second direction; and
- along the circumferential direction of the rotation block, an area of the abutting face at either of two ends is greater than an area of the abutting face at a middle section, and one of the abutting faces at the two ends is arranged away from the first identification portion along a radial direction of the rotation block, and the other of the abutting faces at the two ends is arranged away from the second identification portion along the radial direction of the rotation block.

3. The reminder apparatus according to claim 2, wherein the abutting faces at the two ends comprise a first face and a second face; wherein the first face is arranged away from the first identification portion along the radial direction of the rotation block, and the second face is arranged away from the second identification portion along the radial direction of the rotation block.

4. The reminder apparatus according to claim 1, wherein the housing comprises a base and a lid; wherein the lid is covered on and fixed to the base to define a receiving space, and the rotation block is arranged in the receiving space.

5. The reminder apparatus according to claim 4, wherein a first latch is arranged on an inner wall of the lid, wherein the inner wall is disposed on the side of the rotation block, and a second latch is arranged on a side where the lid is covered on the base; wherein the second latch and the first latch are oppositely arranged, such that the lid is covered on the base via the first latch and the second latch that are engaged with each other; and wherein the first latch is protruded from an inner wall of the lid, the second latch is protruded from an inner wall of the base, the first latch and the second latch respectively comprise a first arc-shaped face and a second arc-shaped face, wherein during assembling the lid and the base, the first arc-shaped face and the second arc-shaped face push each other and are deformed, such that the first latch and the second latch are engaged and fixed.

6. The reminder apparatus according to claim 5, wherein the first latch and the second latch respectively comprise a first flat face and a second flat face; wherein the first flat face and the second flat face are engaged with each other in the case that the first latch and the second latch push each other.

7. The reminder apparatus according to claim 4, wherein the viewing window is defined on the lid, and the base comprises an arc-shaped section recessed toward the lid; wherein the abutting inner wall is formed on an inner wall of the arc-shaped section.

8. The reminder apparatus according to claim 1, wherein a toggle structure is arranged on the circumferential outer wall of the rotation block; wherein the toggle structure is exposed via the viewing window.

9. The reminder apparatus according to claim 8, wherein the toggle structure comprises: a toggle lever; wherein the toggle lever is protruded from a surface of the housing via the viewing window, such that in the case that the rotation block is rotated, the toggle lever is abutted against inner walls on two opposite sides of the viewing window along a circumferential direction of the rotation block to restrict a maximum stroke of the rotation block.

10. The reminder apparatus according to claim 9, wherein the inner walls on the two opposite sides of the viewing window comprise: a first inner wall and a second inner wall; wherein in the case that the toggle lever is toggled along a counterclockwise direction, the toggle lever is abutted against the first inner wall to restrict continuous rotation of the rotation block, and in the case that the toggle lever is toggled along a clockwise direction, the toggle lever is abutted against the second inner wall to restrict continuous rotation of the rotation block.

11. The reminder apparatus according to claim 1, wherein a plurality of the rotation blocks are arranged; wherein the plurality of the rotation blocks are axially arranged in the housing, a plurality of the viewing windows are defined on the housing, a number of the rotation blocks is equal to a number of the viewing windows, and the rotation blocks are arranged in one-to-one correspondence to the viewing windows.

12. The reminder apparatus according to claim 1, wherein a spacer plate is arranged between each two adjacent rotation blocks in the housing; wherein the spacer plate is configured to space the adjacent rotation blocks apart and limit the rotation blocks.

13. A medication container, comprising:

a container body; and a reminder apparatus;

wherein the container body is configured to receive a medication, and the reminder apparatus is fixed to the container body; wherein the reminder apparatus comprises:

a housing; and a rotation block;

wherein the rotation block is rotatably arranged in the housing, an identification structure is arranged on a surface of the rotation block, and a viewing window is defined in the housing, such that the identification structure is exposable via the viewing window in the case that the rotation block is rotated;

wherein the identification structure is arranged on a circumferential outer wall of the rotation block, and the housing is provided with an abutting inner wall opposite to the viewing window; wherein a damping structure is arranged on the circumferential outer wall of the rotation block, such that in the case that the rotation block is rotated, the damping structure is engaged with the abutting inner wall to increase an action force between the rotation block and the housing; and wherein the damping structure comprises an abutting section; wherein the abutting section comprises a plurality of adjacent abutting faces, such that in the case that the rotation block is rotated, the plurality of abutting faces are successively abuttable against the abutting inner wall to fix the rotation block to different rotation positions.

14. The medication container according to claim 13, wherein the identification structure comprises a first identification portion and a second identification portion; wherein the first identification portion and the second identification portion are arranged along a circumferential direction of the rotation block, such that the first identification portion is exposed via the viewing window in the case that the rotation block is rotated along a first direction, and the second identification portion is exposed via the viewing window in the case that the rotation block is rotated along a second direction; and along the circumferential direction of the rotation block, an area of the abutting face at either of two ends is greater than an area of the abutting face at a middle section, and one of the abutting faces at the two ends is arranged away from the first identification portion along a radial direction of the rotation block, and the other of the abutting faces at the two ends is arranged away from the second identification portion along the radial direction of the rotation block.

15. The medication container according to claim 14, wherein the abutting faces at the two ends comprise a first face and a second face; wherein the first face is arranged away from the first identification portion along the radial direction of the rotation block, and the second face is arranged away from the second identification portion along the radial direction of the rotation block.

16. The medication container according to claim 13, wherein the housing comprises a base and a lid; wherein the lid is covered on and fixed to the base to define a receiving space, and the rotation block is arranged in the receiving space.

* * * * *